(12) United States Patent
Weatherly, Sr. et al.

(10) Patent No.: US 7,861,617 B2
(45) Date of Patent: Jan. 4, 2011

(54) HAND-OPERATED SWAGE DEVICE

(75) Inventors: James S. Weatherly, Sr., Scappoose, OR (US); Gregory S. Richardson, Estacada, OR (US); Paul Gardner, Vancouver, WA (US); Norman Andrew Brown, Kalama, WA (US); Marc Elkins, Washougal, WA (US); Roy Erdwins, Washougal, WA (US); Robert L. Woods, Mulino, OR (US)

(73) Assignee: Simonds International, Inc., Fitchburg, MA (US)

( * ) Notice: Subject to any disclaimer, the term of this patent is extended or adjusted under 35 U.S.C. 154(b) by 775 days.

(21) Appl. No.: 11/731,621

(22) Filed: Mar. 30, 2007

(65) Prior Publication Data
US 2008/0236339 A1    Oct. 2, 2008

(51) Int. Cl.
*B23D 63/06* (2006.01)
(52) U.S. Cl. ............... 76/54; 76/51; 76/53; 76/57
(58) Field of Classification Search ........... 76/51–57
See application file for complete search history.

(56) References Cited

U.S. PATENT DOCUMENTS

| | | | |
|---|---|---|---|
| 415,614 A | 11/1889 | Campbell | |
| 762,195 A | 6/1904 | Renie | |
| 818,179 A | 4/1906 | Lipsey | |
| 905,989 A | 12/1908 | Coyle | |
| 983,427 A * | 2/1911 | Carroll | 76/54 |
| 1,492,152 A | 4/1924 | Armstrong | |
| 1,557,090 A | 10/1925 | Ricker | |
| 1,657,735 A | 1/1928 | Armstrong | |
| 1,856,034 A | 4/1932 | Taylor | |
| 1,863,910 A * | 6/1932 | Morey | 76/54 |
| 1,915,225 A | 6/1933 | Gommel | |
| 1,943,863 A | 1/1934 | Gommel | |
| 2,097,659 A * | 11/1937 | Ferrari et al. | 76/54 |
| 2,190,920 A | 2/1940 | Hanchett | |
| 2,451,759 A | 10/1948 | Maurer | |
| 2,800,039 A | 7/1957 | Vollmer | 76/54 |
| 2,985,039 A | 5/1961 | Kivimaa | |
| 3,416,394 A * | 12/1968 | Stier et al. | 76/49 |
| 3,496,804 A * | 2/1970 | Heitzman | 76/51 |
| 4,331,047 A * | 5/1982 | English | 76/41 |

(Continued)

OTHER PUBLICATIONS

AutoSwage Datasheet, "Armstrong's AutoSwage Automatic Band Saw Swage and Shaper," retrieved from the internet on Jan. 12, 2007 (http://www.armstrongblue.com/New_Products/AutoSwageDataSheet.htm), 2004, 2 pages.

(Continued)

*Primary Examiner*—Hwei-Siu C Payer
(74) *Attorney, Agent, or Firm*—BainwoodHuang

(57) ABSTRACT

A hand-operated swage device includes a first hand-operated actuator and a second hand operated actuator that, when actuated together, control the sequential operation of a clamping mechanism and a swaging mechanism of the hand-operated swage device. For example, the first actuator of the swage device is disposed on a first handle while the second actuator is disposed on a second handle of the swage device. To operate the hand-operated swage device, an operator grasps the first handle with one hand and grasps the second handle with his other hand to actuate both of the actuators in a substantially simultaneous manner. Actuation of both actuators controls sequential delivery of pressurized air to a first pneumatic device mechanically coupled to the clamping mechanism and to a second pneumatic device mechanically coupled to the swaging mechanism.

21 Claims, 11 Drawing Sheets

U.S. PATENT DOCUMENTS

| | | | |
|---|---|---|---|
| 4,426,894 A | 1/1984 | Nicolodi | 76/54 |
| 2008/0236339 A1* | 10/2008 | Weatherly et al. | 76/57 |
| 2008/0236340 A1* | 10/2008 | Weatherly et al. | 76/57 |

OTHER PUBLICATIONS

Armstrong Precision Swages Data Sheet, "Armstrong Swages for Band, Circular and Sash Gang Saws," retrieved from the internet on Jan. 18, 2007 (http://www.armstrongblue.com/swages/swagesdatasheet.htm), 2 pages.

Armstrong Air Swages Tool Adjustment Operating Instructions Datasheet, "Armstrong Air Swages Tool Adjustment Operating Instructions," retrieved from the internet on Jan. 18, 2007 (http://www.armstrongblue.com/Swages/AirSwageOperDatasheet.htm), 3 pages.

\* cited by examiner

HAND-OPERATED SWAGE DEVICE

BACKGROUND

It is well known to use a saw blade, such as a bandsaw blade, to cut materials to a desired size. During cutting, material is removed from a work piece by a series of teeth formed into one edge of a steel strip or saw blade body which makes up the saw blade. For conventional saw blades, the teeth are manufactured such that, during operation, as the teeth pass through and remove material form the work piece, the teeth create a slot or kerf that is wider than a thickness of the saw blade. The kerf formed in the work piece allows passage of the saw blade body through the work piece during operation and minimizes saw blade binding.

The teeth of a conventional saw blade can be manufactured and arranged in various ways to ensure the generation of the kerf in a work piece during operation. In one process of saw blade manufacturing, saw blade teeth undergo a swaging procedure to widen a face portion of each tooth.

Swaging is a cold-working process in which a metal material is plastically deformed under high-pressure into a particular shape. Conventional swaging mechanisms include an anvil, such as disposed in a holder or swage head, an eccentric die, and a set of clamps, such as clamp screws. During use, a manufacturer positions a saw blade within the swaging mechanism such that a tooth to be swaged is disposed between the anvil and the die. The manufacturer actuates a pair of clamp screws disposed on opposing sides of the saw in order to secure the saw within the swaging mechanism. Next, the manufacturer adjusts the position of the anvil and the swage head such that the anvil abuts a back portion of the tooth. The anvil acts as a physical support for the tooth during the swaging process. Next, the manufacturer actuates the eccentric die which causing the die to rotate against the front portion of the tooth. This rotation flares the material of the front portion of the tooth toward either side of a centerline of the saw blade to widen the tooth relative to the saw blade body. The manufacturer then repositions the swaging mechanism relative to the next tooth to be swaged and repeats the process.

SUMMARY

While various types of swaging mechanisms exist, one type of swaging device includes a hand-operated or manual swage device. Certain manual swage devices include a hand-operated clamp lever connected to a pair of clamp screws and a die lever operatively connected to an eccentric die. In use, an operator positions the swage device over a saw blade such that a tooth to be swaged is disposed between the anvil and the die. The operator then manually operates the clamp lever to rotate the clamping screws and clamp the saw to the swaging device. Next, the operator manually operates the die lever during the swaging operation to rotate the eccentric die and swage the tooth. The operator can then reposition the swaging device on the saw blade to repeat the swaging process on another tooth.

While the manual swage device is effective in swaging the teeth of a saw blade, the conventional swage devices create a relatively dangerous working environment for the operator. For example, with the manual swage device described above, the operator actuates one lever with one hand to operate the clamp screws and actuates a second lever with one hand to actuate the eccentric die. In this configuration, during the clamping procedure, the operator can potentially position his free hand in proximity to the clamping screw. Additionally, during the swaging procedure, the operator can also potentially position his free hand in proximity to the eccentric die. In either case, the operator runs the risk of injuring his free hand during operation of the swaging device.

By contrast to conventional swaging devices, embodiments of the present invention relate to a hand-operated swage device having a first hand-operated actuator and a second hand operated actuator that, when actuated together, control the sequential operation of a clamping mechanism and a swaging mechanism of the hand-operated swage device. For example, the first actuator of the swage device is disposed on a first handle while the second actuator is disposed on a second handle of the swage device. To operate the hand-operated swage device, an operator grasps the first handle with one hand and grasps the second handle with his other hand to actuate both of the actuators in a substantially simultaneous manner. Actuation of both actuators controls sequential delivery of pressurized air to a first pneumatic device mechanically coupled to the clamping mechanism and to a second pneumatic device mechanically coupled to the swaging mechanism. With such a configuration of the hand operated swage device, during operation, the operator's hands are clear of the clamping and swaging mechanisms thereby minimizing the risk of accidental injury to the operator.

In one arrangement, a swage device includes a frame, a swaging mechanism coupled to the frame and being operable to swage a tooth of a saw blade, and a clamping mechanism coupled to the frame and being operable to secure the saw blade to the swage device. The swage device also includes a first actuator coupled to the frame, the first actuator being actuatable by a first hand of an operator and a second actuator coupled to the frame, the second actuator being actuatable by a second hand of the operator. The first actuator and the second actuator are configured to control sequential operation of the clamping mechanism and the swaging mechanism after actuation of both the first actuator and the second actuator. In this arrangement, during operation, the operator's hands are clear of the clamping and swaging mechanisms thereby minimizing the risk of accidental injury to the operator.

In one arrangement a swage system includes a frame, a swaging mechanism coupled to the frame and being operable to swage a tooth of a saw blade, and a clamping mechanism coupled to the frame and being operable to secure the saw blade to the swage device. The swage system includes a first pneumatic device coupled to the clamping mechanism and a second pneumatic device coupled to the swaging mechanism. The swage system also includes a pressurized air source in fluid communication with the first pneumatic device and the second pneumatic device, a first actuator coupled to the frame and in fluid communication with the first pneumatic device and the second pneumatic device, the first actuator being actuatable by a first hand of an operator, and a second actuator coupled to the frame, and in fluid communication with the first pneumatic device and the second pneumatic device, the second actuator being actuatable by a second hand of the operator. Actuation of both the first actuator and the second actuator is operable to provide air to the first pneumatic device and the second pneumatic to cause sequential operation of the clamping mechanism and the swaging mechanism.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a hand-operated swage device having a first hand-operated actuator and a second hand operated actuator that, when actuated together, control the sequential operation of a clamping mechanism and a swaging mechanism of the hand-operated swage device. For example, the first actuator of the swage device is disposed on a first handle while the second actuator is disposed on a second handle of the swage device. To operate the hand-operated swage device, an operator grasps the first handle with one hand and grasps the second handle with his other hand to actuate both of the actuators in a substantially simultaneous manner. Actuation of both actuators controls sequential delivery of pressurized air to a first pneumatic device mechanically coupled to the clamping mechanism and to a second pneumatic device mechanically coupled to the swaging mechanism. With such a configuration of the hand operated swage device, during operation, the operator's hands are clear of the clamping and swaging mechanisms thereby minimizing the risk of accidental injury to the operator.

Figure 1:
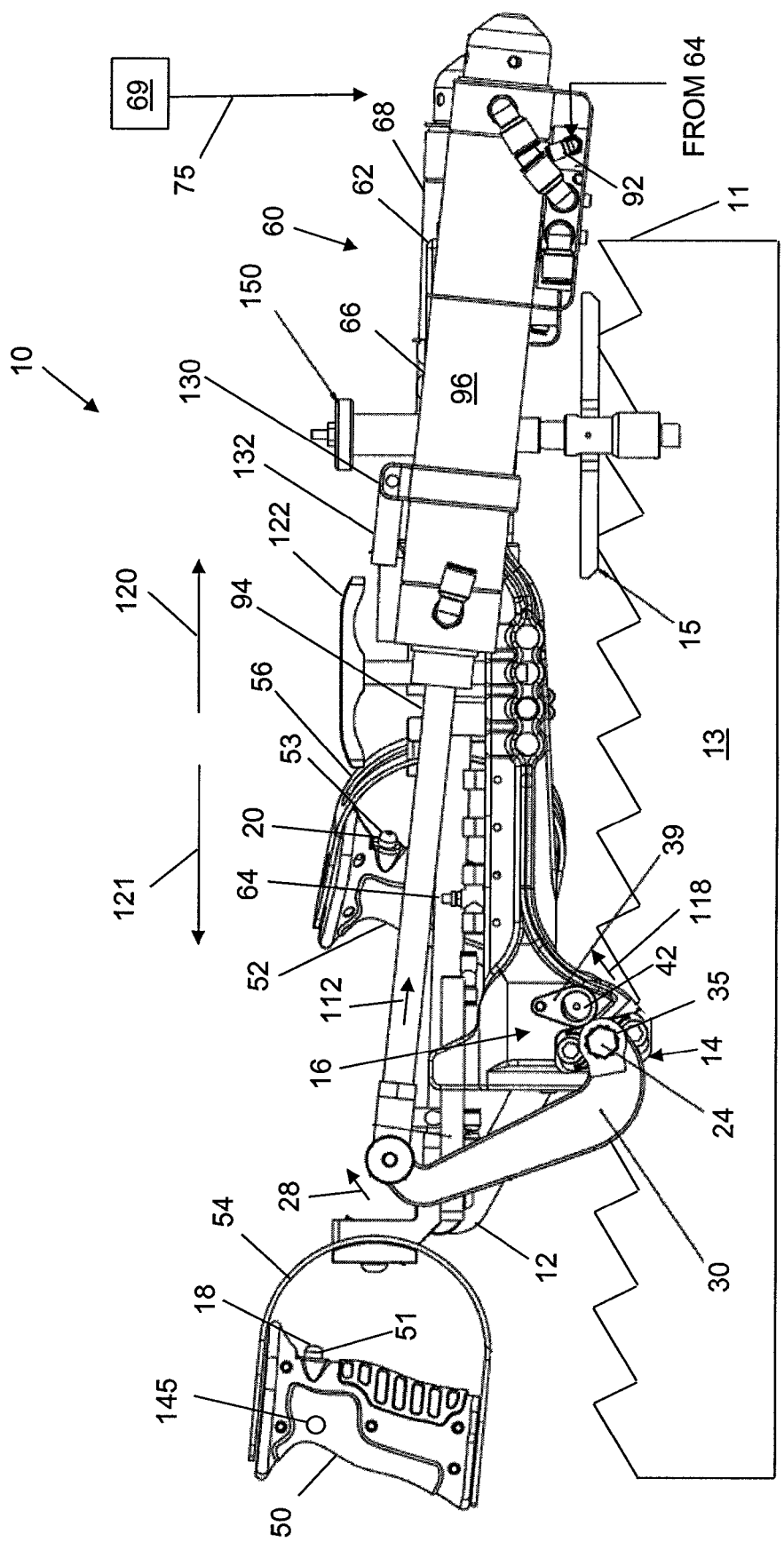
FIG. 1 illustrates a side view of a swage device, according to one embodiment of the invention.
Figure 2:
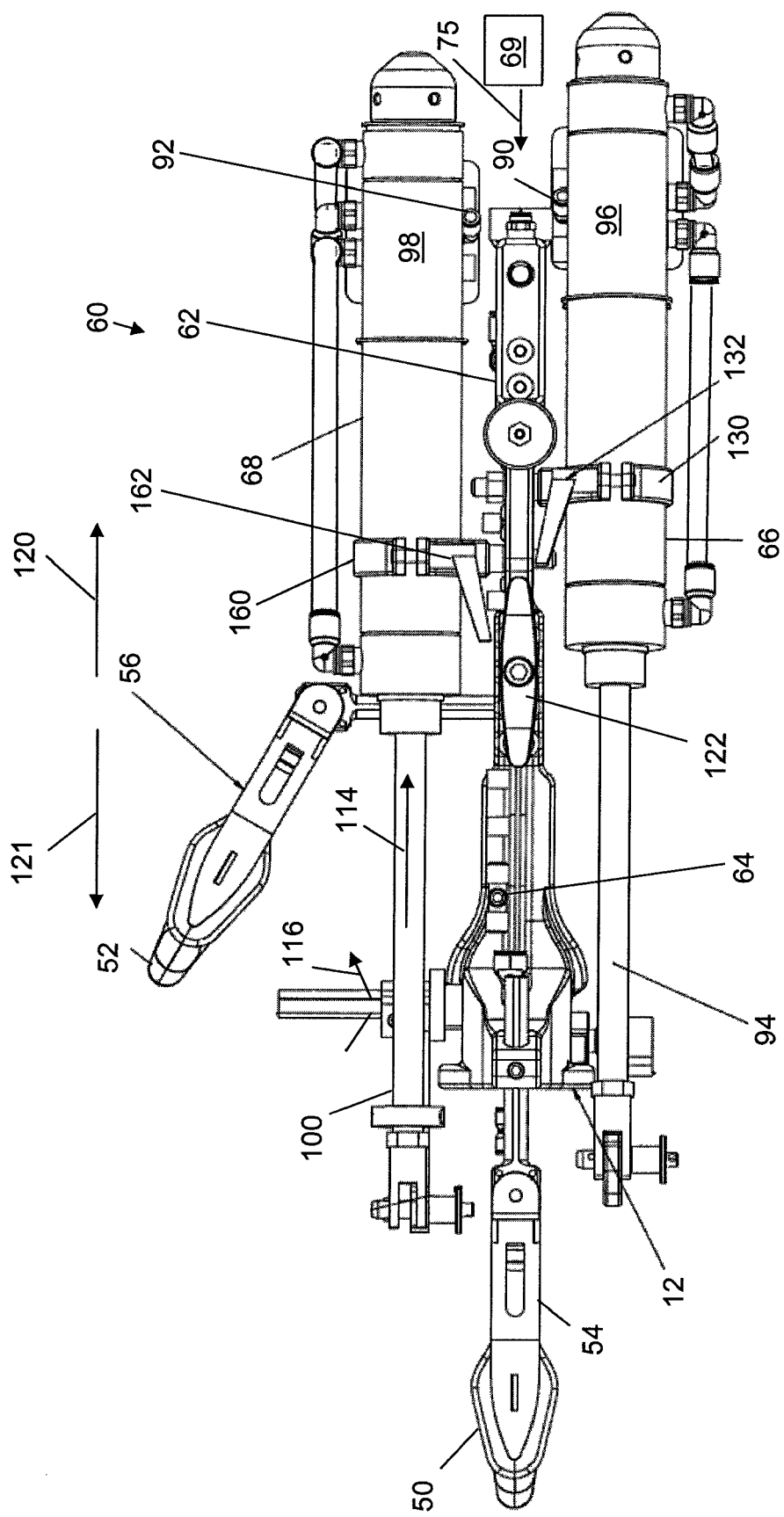
FIG. 2 illustrates a top view of the swage device of FIG. 1.
Figure 3A:
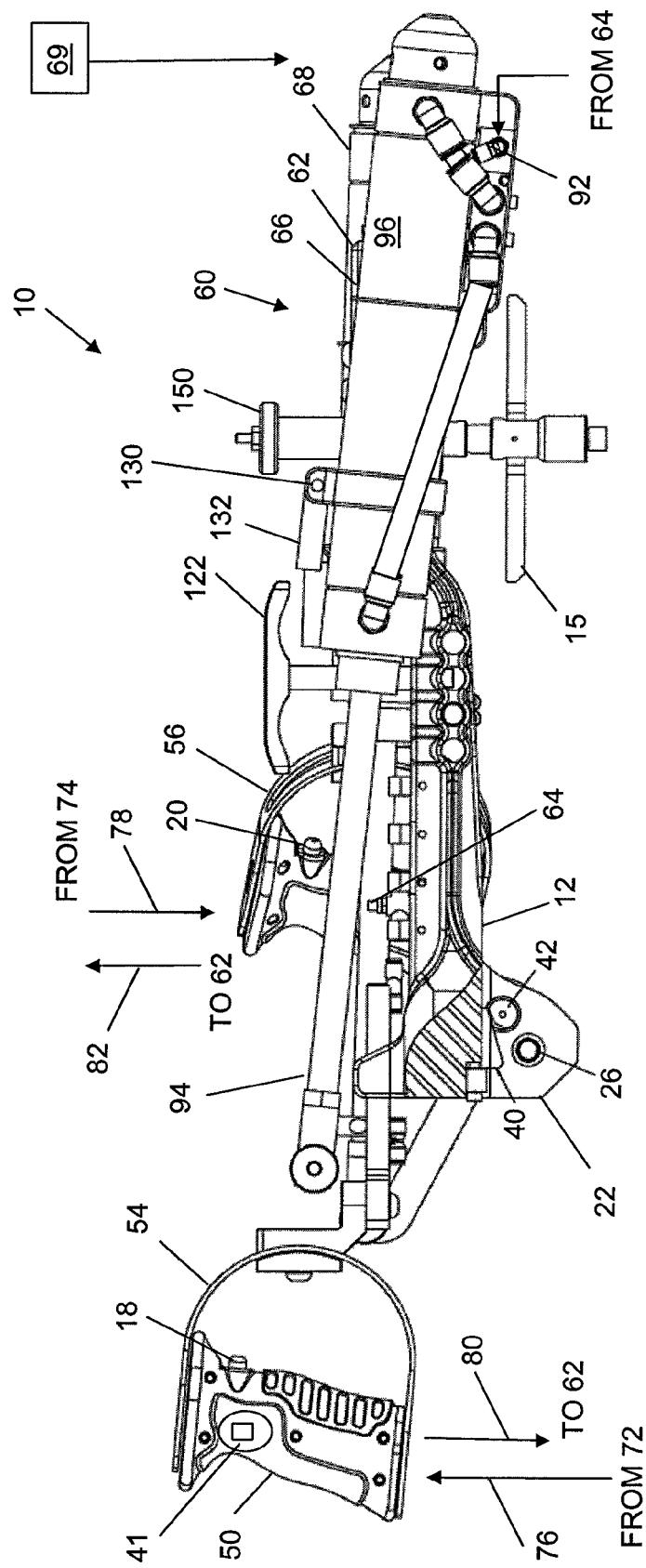
FIG. 3A illustrates a partial cutaway view of the swage device of FIG. 1 showing a swaging mechanism associated with the swage device.
Figure 3B:
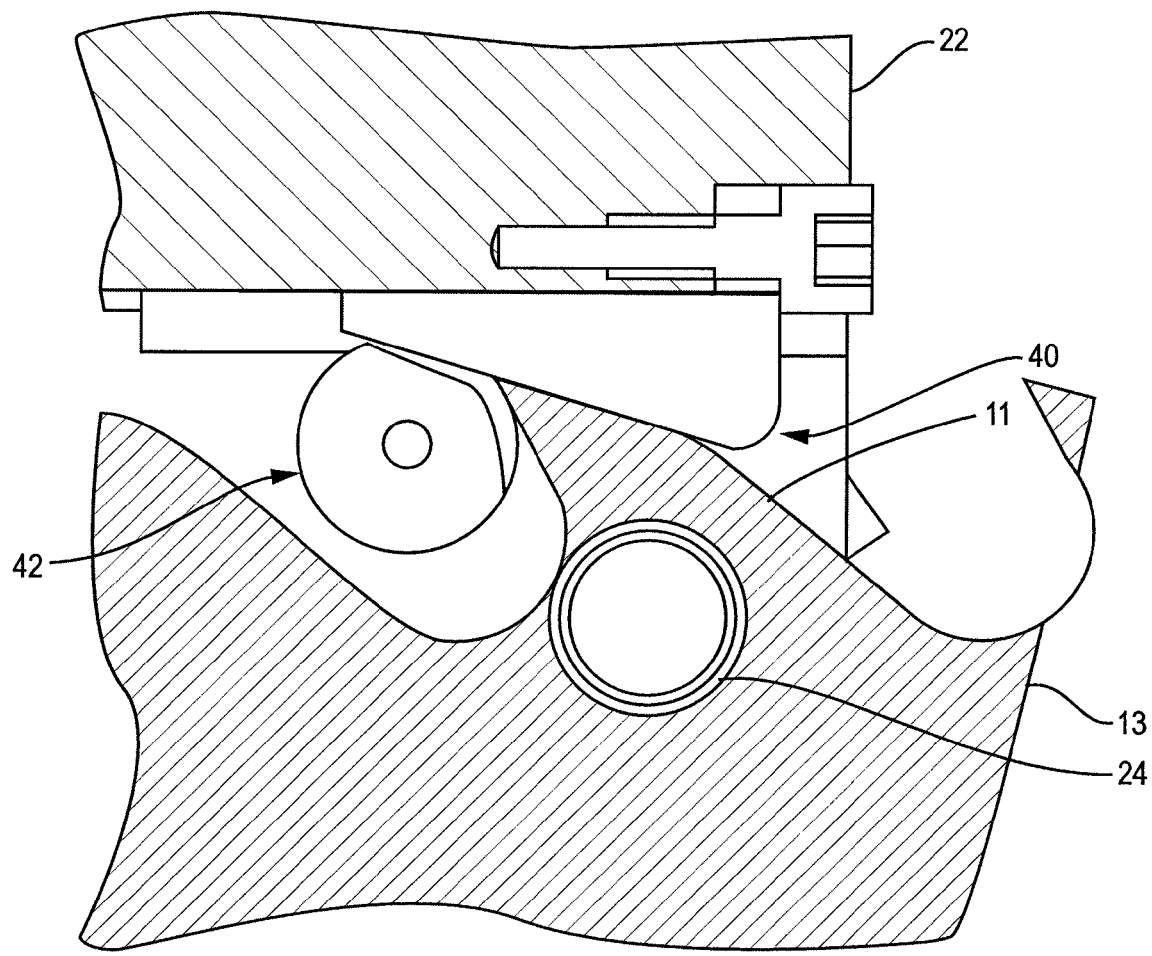
FIG. 3B illustrates the swaging mechanism of FIG. 3A.

FIGS. 1 through 3B illustrate an example of a swage device 10 configured to swage saw blade teeth 11 of a saw blade 13. The swage device 10 includes a frame 12 that supports a clamping mechanism 14 and a swaging mechanism 16. The swage device 10 also includes a first actuator 18 and a second actuator 20 that are configured to operate the clamping mechanism 14 and the swaging mechanism 16 during a swaging procedure. Furthermore, the swage device 10 also includes a saw blade support structure. For example, as shown in FIGS. 2 and 3, the frame 12 of the swage device 10 includes a guide shoe 15 and a swage head 22. The guide shoe 15 is configured to support a distal end portion of the swage device 10 on the saw blade 13 and the swage head 22 is configured to support a proximal end portion of the swage device 10 on the saw blade 13 during a swaging procedure.

The clamping mechanism 14 is operable to secure the saw blade 13 to the swage device 10. As shown with particular reference to FIGS. 1, 3A, and 3B, the clamping mechanism 14, for example, includes a clamp member 24 and a stationary member 26 disposed within a swage head 22. For example, as shown with reference to FIGS. 6A through 6C, the clamp member 24 is disposed within a first opening 27 defined by the swage head 22 and the stationary member 26 is disposed within a second opening 29 defined by the swage head 22. While the clamp member 24 and the stationary member 26 can be configured in a variety of ways, in one arrangement, the clamp member 24 is configured as a clamp screw and the stationary member 26 is configured as a stationary screw.

The swaging mechanism 16, as illustrated in FIGS. 3A and 3B, includes a swage anvil 40 and an eccentric die 42 disposed within the swage head 22. For example, as shown with reference to FIGS. 6A through 6C, the eccentric die 42 is disposed within a die opening 29 defined by the swage head 22 and the swage anvil 40 is disposed within an anvil opening 33 defined by the swage head. The swage anvil 40 is configured to support a saw blade tooth 11 during a swaging procedure and the eccentric die 42 is configured to swage a front portion of the saw blade tooth 11 during the swaging procedure.

Figure 6A:
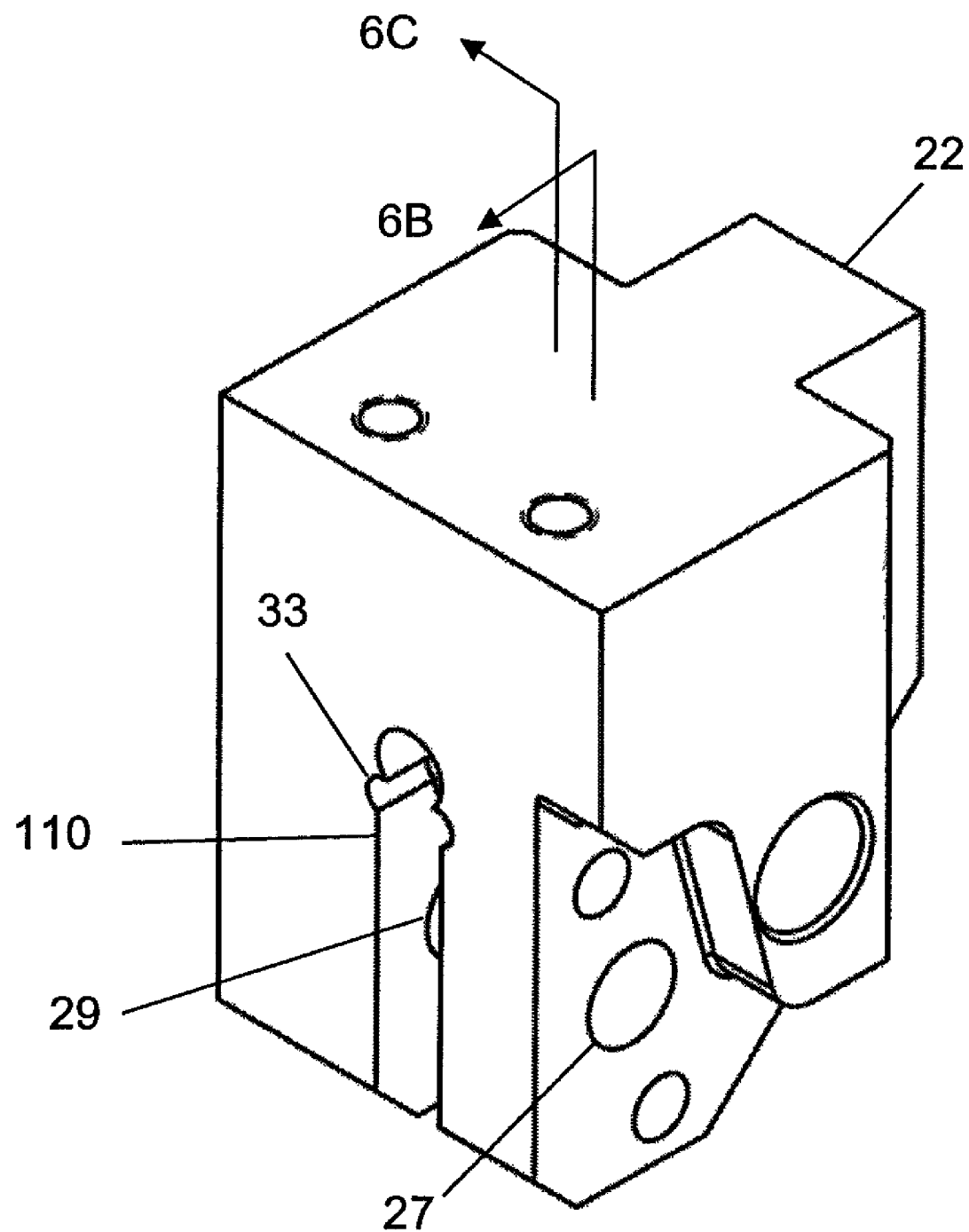
FIG. 6A illustrates a perspective view of a die of the swage device as shown in FIG. 3A.
Figure 6B:
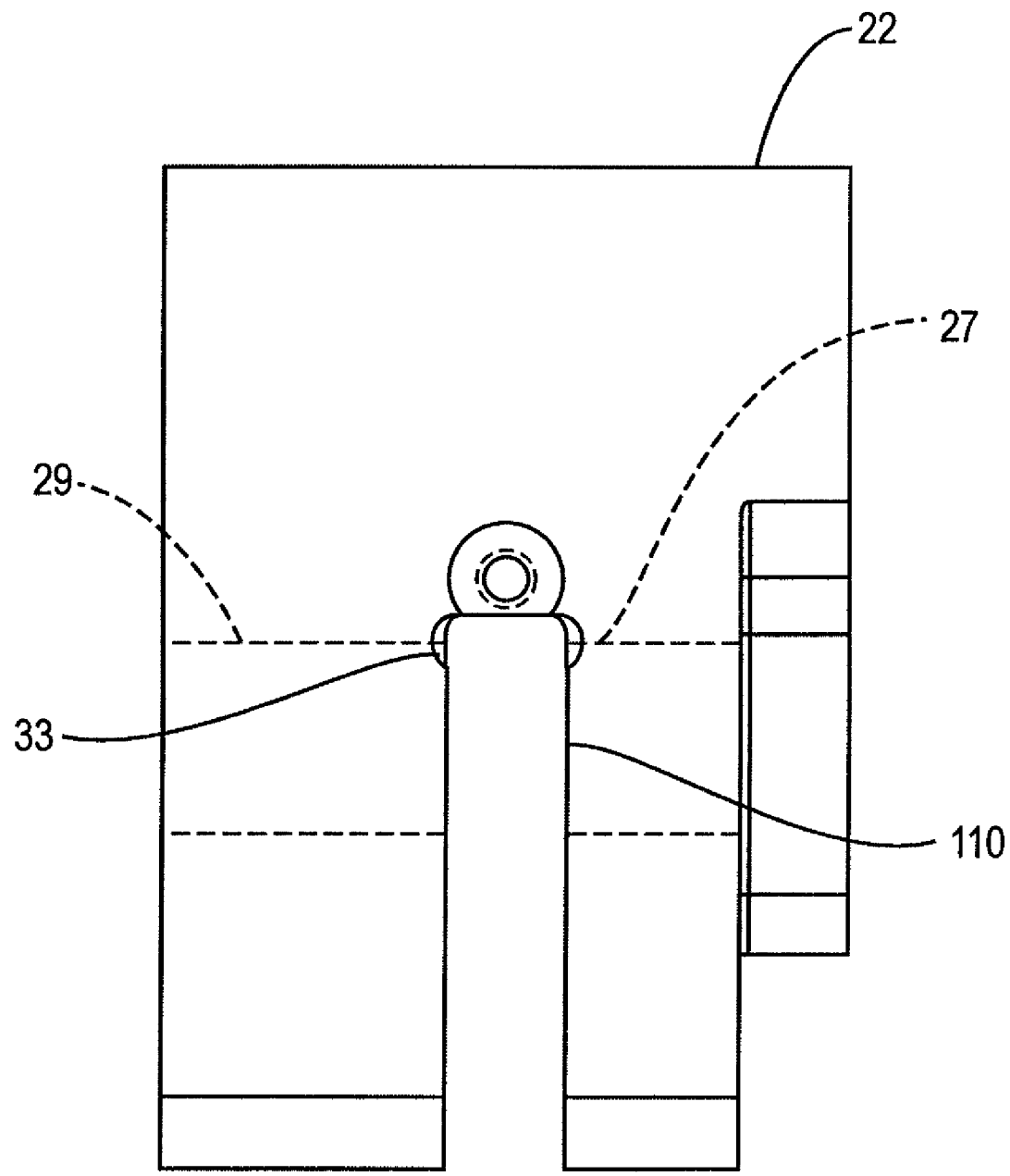
FIG. 6B illustrates a rear view of the die of FIG. 6A.
Figure 6C:
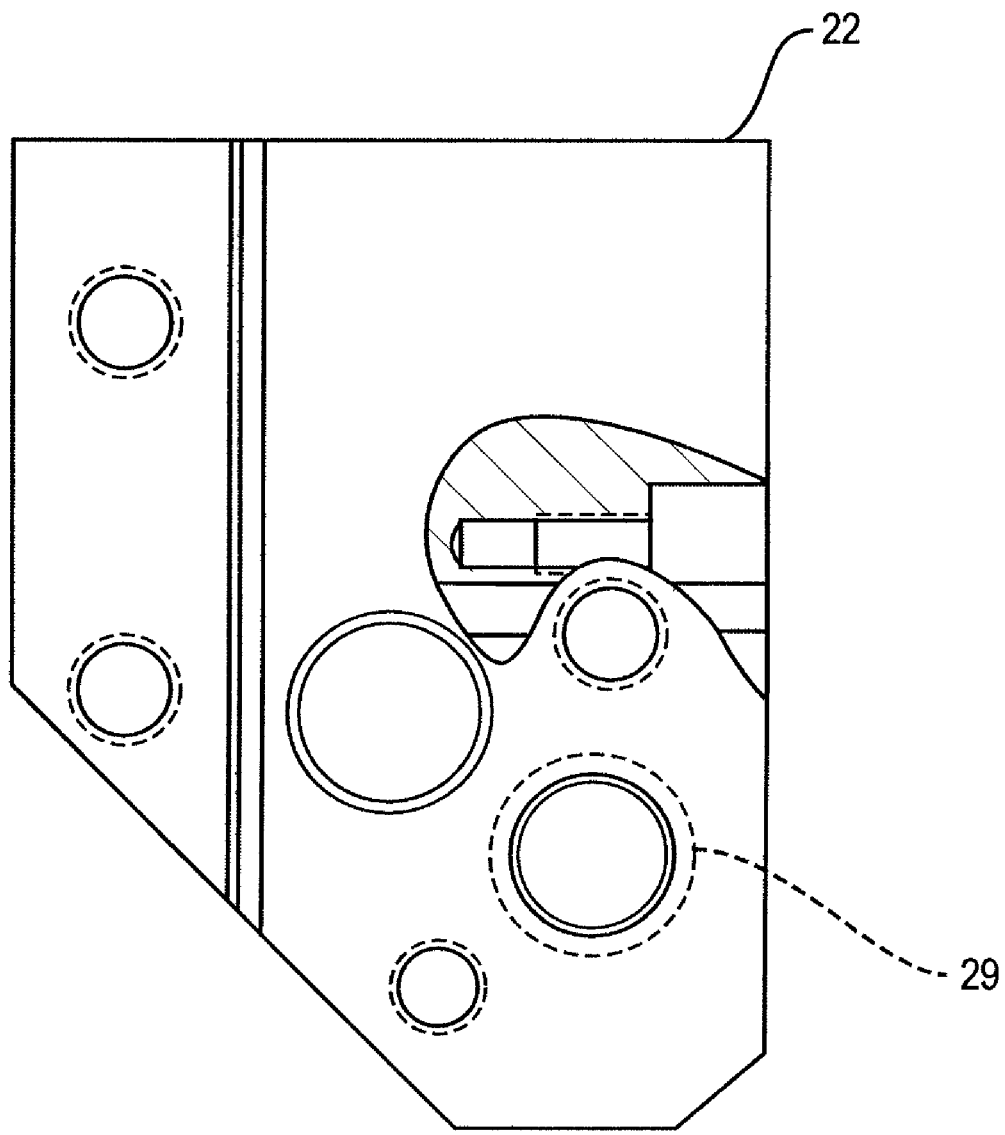
FIG. 6C illustrates a side view of the die of FIG. 6A.
Figure 7A:
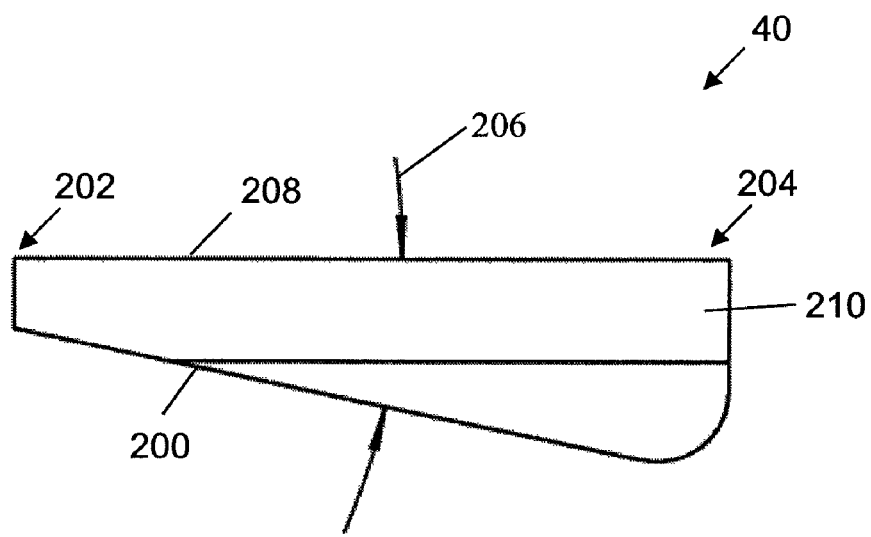
FIG. 7A illustrates a side view of a swage anvil of the swage device of FIG. 1.
Figure 7B:
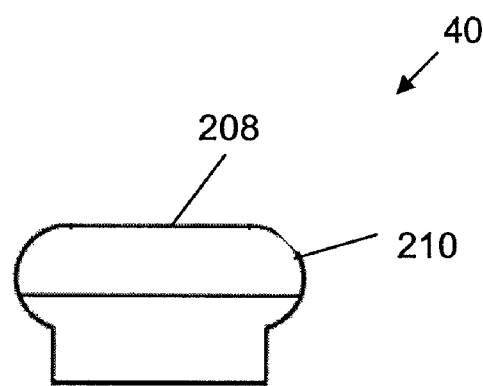
FIG. 7B illustrates a front view of the swage anvil of the swage device of FIG. 7A.
Figure 7C:
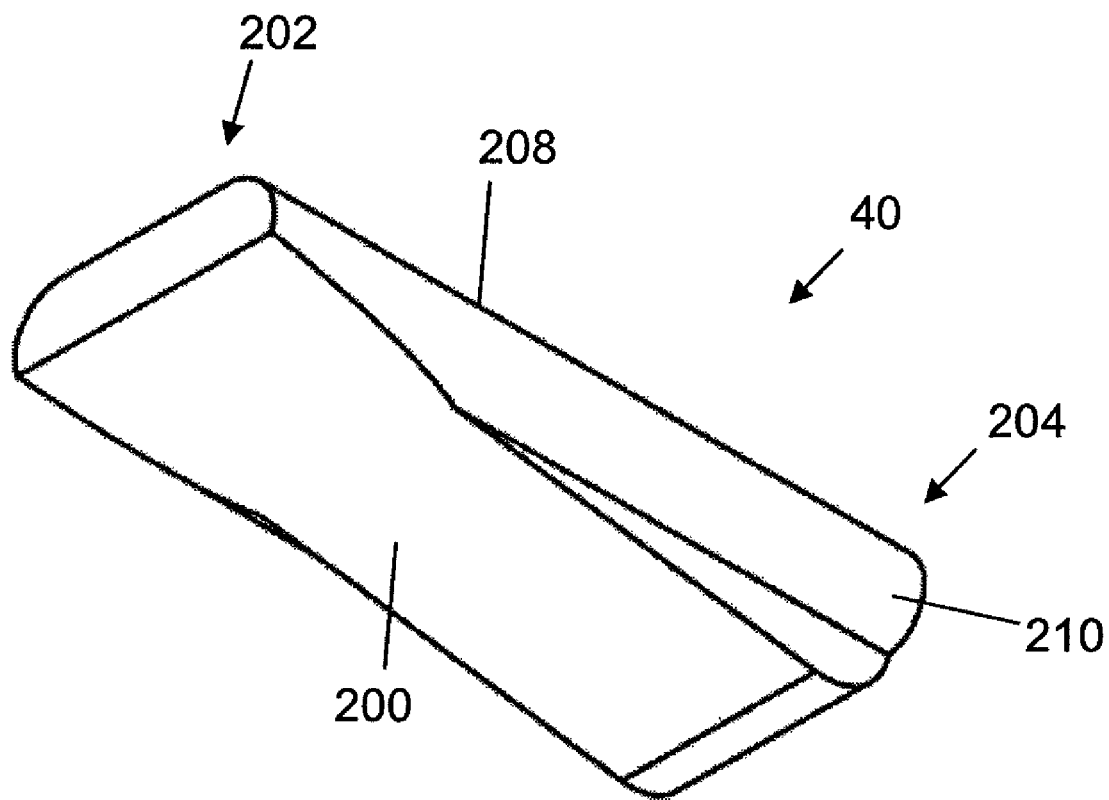
FIG. 7C illustrates a bottom perspective view of the swage anvil of the swage device of FIG. 7A.

With reference to FIGS. 3A and 3B, while the swage anvil 40 can have a variety of configurations, in one arrangement, the swage anvil 40 is configured as the swage anvil described in U.S. application Ser. No. 11/731,671 entitled "SWAGE ANVIL FOR A SAWBLADE SWAGE ASSEMBLY," the contents and teachings of which are hereby incorporated by reference in their entirety. For example, as shown in FIGS. 7A through 7C, the swage anvil 40 includes an elongate body and defines a tooth contact face 200 which extends between a first end 202 and a second end 204 of the elongate body. The tooth contact face 200 defines an angle 206 relative to an upper coupling portion surface 208 of the swage anvil 40. The angle 206 of the tooth contact face 200 corresponds to (e.g., mirrors) an angle defined by the back portion of a saw blade tooth 11 relative to a long axis of a saw blade 13 (e.g., as shown in FIG. 3B). The swage anvil 40 also includes a coupling portion 210 that extends between the first end 202 and the second end 204 of the elongate body. With reference to FIGS. 6A through 6C, the coupling portion 210 of the swage anvil 40 is configured to be inserted within the slot 33 of the swage head 22. Interaction between the coupling portion 210 of the swage anvil 40 and the swage head 22 constrains movement of the swage anvil 40 to a substantially lateral movement substantially parallel to a long axis of the saw blade 11 carried by the swage device 10.

Returning to FIG. 1, in one arrangement, the eccentric die 42 is coupled to the swage head 22 via a swage die guide bushing 39. The swage die guide bushing 39 is removeably attached to the swage head 22 by a fastener 45 and allows differently sized eccentric dies to be used with the swage device 10. For example, an operator can select either a ½ inch swage die or a ⅝ inch swage die for use during a swaging procedure and attach the selected swage die to the swage device using the swage die guide bushing 39.

Returning to FIGS. 1 through 3A, the first and second actuators 18, 20 are actuatable by separate hands of an operator to control the sequential operation of the clamping and swaging mechanisms 14, 16. For example, the first actuator 18 is disposed on a first handle 50 and is coupled to the frame 12 by a first bracket 54 while the second actuator 20 is disposed on a second handle 52 and is coupled to the frame 12 by a second bracket 56. Based upon the relative positioning of the first and second actuators 18, 20, in order to operate the swage device 10, an operator can grasp the first handle 50 with his right hand and can grasp the second handle 52 with his left hand in order to actuate the respective actuators 18, 20. With such a configuration of the swage device 10, during operation, the operator's hands are clear of the clamping and swaging mechanisms 14, 16, thereby minimizing the risk of accidental injury to the operator.

In one arrangement, the first and second actuators 18, 20 form part of a pneumatic drive apparatus 60 that controls the operation of the clamping and swaging mechanisms 14, 16. For example, as indicated in FIG. 3A, the first and second actuators 18, 20 are configured as a first actuator valve 41 and a second actuator valve 43 disposed within the first and second handles 50, 52, respectively, that are operable to control the delivery of pressurized air to the clamping and swaging mechanisms 14, 16. With reference to FIGS. 1 through 3A, the pneumatic drive apparatus 60 includes, in addition to the first and second actuator valves 41, 43, a manifold 62, a timing valve 64, a first pneumatic device 66, and a second pneumatic device 68.

Figure 4:
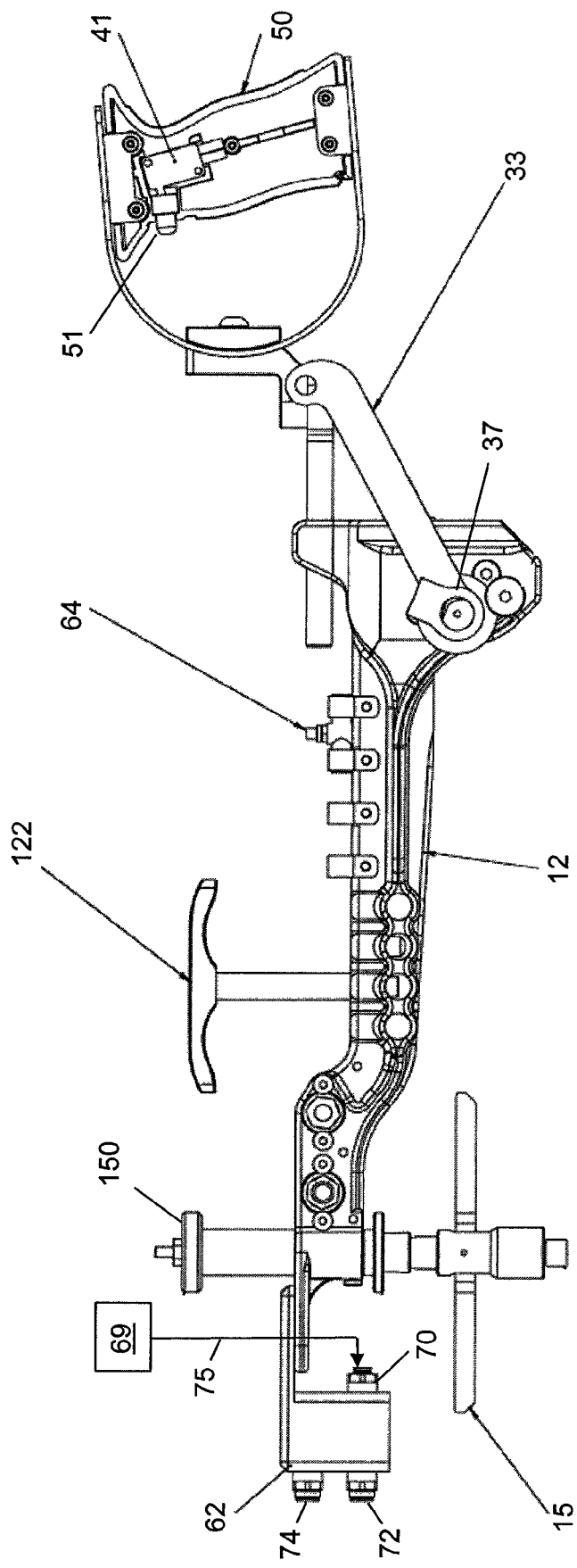
FIG. 4 illustrates a first side view of a frame of the swage device of FIG. 1.

The manifold 62 is configured to distribute air, such as air from a pressurized air source 69, to the first and second actuator valves 41, 43. For example, as shown in FIG. 4, the manifold 62 includes a manifold inlet 70, a first manifold outlet 72, and a second manifold outlet 74. The manifold inlet 70 is coupled to the pressurized air source 69, such as an air pump or compressor via, a tube or conduit 75 and is configured to receive air from the pressurized air source 69. The first and second manifold outlets 72, 74 are configured to transmit the pressurized air received at the manifold inlet 70 to the first and second actuator valves 41, 43. For example, with reference to FIG. 3A, the first manifold outlet 72 is coupled to an input port (not shown) associated with the first actuator valve 41 via a first conduit 76 and the second outlet 74 is coupled to an input port (not shown) associated with the second actuator valve 43 via a second conduit 78. In this arrangement, the first and second actuator valves 41, 43 are configured to receive pressurized air from the manifold 62.

Additionally in this arrangement, the first and second actuator valves 41, 43 are configured to transmit the air received from the manifold 62 to the timing valve 64. For example, the first actuator valve 41 includes an output port (not shown) coupled to the timing valve 64 via a conduit 80 and the second actuator valve 43 includes an output port (not shown) coupled to the timing valve 64 via a conduit 82. In one arrangement, actuation of both of the first and second actuator valves 41, 43 controls the flow of the pressurized air into the timing valve 64. The timing valve 64, such as a bleeder valve, is configured to control sequential operation of the clamping and swaging mechanisms 14, 16 via the first pneumatic device 66 and the second pneumatic device 68.

The first pneumatic device 66, as shown in FIGS. 1 through 3A, is configured to receive pressurized air from the timing valve 64 to control the operation of the clamping mechanism 14. For example, the first pneumatic device 66 includes an inlet port 90 coupled to the timing valve 64 via a conduit (not shown). The first pneumatic device 66 also includes a shaft 94 having a first end configured as a plunger and disposed within a cylindrical housing 96 and a second end coupled to the clamping mechanism 14 via a drive arm 30. In one arrangement, as illustrated in FIG. 1, the second end of the drive arm 30 defines a socket 35 into which a head of the clamp member 24 is inserted. In such an arrangement, the drive arm 30 controls the relative rotation of the clamp member 24, 8-pitch ACME screw, within the swage head 22. The 8-pitch ACME screw is configured such that rotation of the 8-pitch ACME screw by a single stroke of the drive arm 30 causes the 8-pitch screw to travel within the swage head 22 along a given distance to either secure the saw blade 13 to the swage device 10 prior to a tooth swaging procedure or to release the saw blade 13 from the swage device 10 at the conclusion of a tooth swaging procedure.

The second pneumatic device 68, as shown in FIGS. 1 through 3A, is configured to receive pressurized air from the timing valve 64 to control the rotation of the eccentric die 42 of the swaging mechanism 16. For example, the second pneumatic device 68 includes an inlet port 92 coupled to the timing valve 64 via a conduit (not shown). The second pneumatic device 68 also includes a shaft 100 having a first end configured as a plunger and disposed within a cylindrical housing 98 and a second end coupled to the eccentric die 42 of the swaging mechanism 16 via a drive arm 33 as illustrated in FIG. 4. In one arrangement, as illustrated in FIG. 4, the second end of the drive arm 33 defines an opening 37 into which the eccentric die 42 is disposed. In such an arrangement, the drive arm 33 controls the rotation of the eccentric die 42 within the swage head 22.

In use, actuation of first and second actuator valves 41, 43 causes sequential operation of the clamping assembly 14 and the swaging assembly 16. For example, with reference to FIGS. 1 through 4 during a swaging procedure, an operator first places the swage device 10 onto a saw blade 13. As indicated in FIG. 1, the operator disposes the guide shoe 15 onto a distal portion of the saw blade 13. The operator also inserts a proximal potion of the saw blade 13 within a saw blade slot 110 defined by the swage head 22 (e.g., as shown in FIGS. 6A and 6B) such that a saw blade tooth 11 is disposed between the clamp member 24 and the stationary member 26 of the clamping mechanism 14. The operator then adjusts the position of the swage anvil 40 within the swage head 22 such that the swage anvil 40 abuts a back portion of the saw blade tooth 11 (e.g., as shown in FIG. 3B). The operator then grasps the first and second handles 50, 52 and actuates the first and second actuator valves 41, 43 to cause sequential operation of the clamping and swaging mechanisms 14, 16. Such actuation positions the first and second valves 41, 43 in an open position and allows delivery of pressurized air, received from the manifold 62 via conduits 76 and 78, to the timing valve 64 via conduits 80 and 82.

When the timing valve 64 receives the pressurized air, the timing valve 64 distributes the pressurized air to the first pneumatic device 66 and the second pneumatic device 68 in a sequential manner in order to provide operation of the clamping mechanism 14 prior to operation of the swaging mechanism 16. For example, the timing valve 64 provides a first amount of air to the first pneumatic device 66 via the inlet port 90 and causes an increase in air pressure within a chamber defined between the plunger of the shaft 94 and the cylinder 96. The increase in pressure causes the shaft 94 to translate along a direction 112 and rotate the drive arm 30 along a clockwise direction 28. With such rotation, the drive arm 30 rotates the clamp member 24 in a clockwise direction to press a portion of the saw blade 11 against the stationary member 26 of the clamping mechanism 14, thereby securing the saw blade 11 to the swage device 10.

The timing valve 64 then releases a second amount of air to the second pneumatic device 68. For example, after actuation of the clamping mechanism 14, the timing valve 64 provides the second amount of air to the inlet port 92 of the second pneumatic device 68 and causes an increase in air pressure within a chamber defined between the plunger of the shaft 100 and the cylindrical housing 98. The increase in pressure causes the shaft 100 to translate along a direction 114 (e.g., as shown in FIG. 2) and rotate the drive arm 33 (as shown in FIG. 4) along a clockwise direction 116. With such rotation, the drive arm 33 rotates the eccentric die 42 in a counterclockwise direction 118 which causes the die 42 to rotate against a front portion of the saw blade tooth 11. Such rotation flares the material of the front portion of the tooth 11 toward either side of a centerline of the saw blade 13 to widen the tooth 11 relative to the saw blade body. Once the swaging procedure has been completed, with reference to FIG. 1, the operator advances the swage apparatus 10 across the saw blade 13 along direction 120, such as by using a handle 122, such that the swaging mechanism 16 is disposed on the next (e.g., subsequent) adjacent saw blade tooth. The operator can then repeat the swaging procedure.

In this arrangement, an operator utilizes both hands causes operation of the clamping and swaging mechanisms 14, 16 of the swage device 10. As such, the configuration of the swage device 10 minimizes the risk of injury to the operator's hands during a swaging procedure.

In one embodiment, portions of the swage device 10 can be adjusted to allow for variations in the geometry of a saw blade being swaged during a swaging procedure. For example, in certain cases, the thickness of a saw blade 13 being swaged by the swage device 10 can vary across its length. This variation in thickness can affect the clamping forces generated by the clamping mechanism 14 on the saw blade 13. Typically, to have optimal clamping of the saw blade 11, the clamp member 24 (e.g., the rotatable clamp screw) provides maximum clamping force on the saw blade 13 at the maximum retracted stroke position of the shaft 94 within the cylindrical housing 96 of the first pneumatic device 66. Variations in the thickness of the saw blade 13 can cause either an increase or a decrease in the clamping forces applied to the saw blade 13 by the clamp member 24. In order to provide substantially consistent clamping forces along the length of the saw blade 13, the swage device 10 is configured to allow coarse and fine adjustment of clamping mechanism 14 to account for variations in saw blade thickness.

In one arrangement, and with reference to FIGS. 1 through 3A, to provide a coarse adjustment of the position of the clamp member 24 relative to the saw blade 13, the first pneumatic device 66 is selectively coupled to the frame 12 of the swage device 10. Such selective coupling allows an operator to optimize the clamping force on the saw blade 13 at the maximum retracted stroke position of the shaft 94. For example, the frame 12 includes a first pneumatic device clamp having a holder 130 and a lever 132 operable to release the first pneumatic device 66 from the holder 130 or to secure the first pneumatic device 66 to the holder 130. In use, to adjust the amount of force generated by the clamp member 24 on the saw blade, the operator actuates the lever 132 to release the cylindrical housing 96 from the holder 130. The operator then positions the cylindrical housing 96 laterally relative to the saw blade 13 along either direction 120 or direction 121 to adjust the position of the drive arm 30 and, in turn, rotate the clamp member 24 within the swage head 22 (e.g., either positioning the clamp member 24 closer to or further away from the saw blade 13). After positioning the clamp member 24 in a desired position, the operator secures the cylindrical housing 96 to the frame 12 by tightening the holder 130 via the lever 132.

Figure 5:
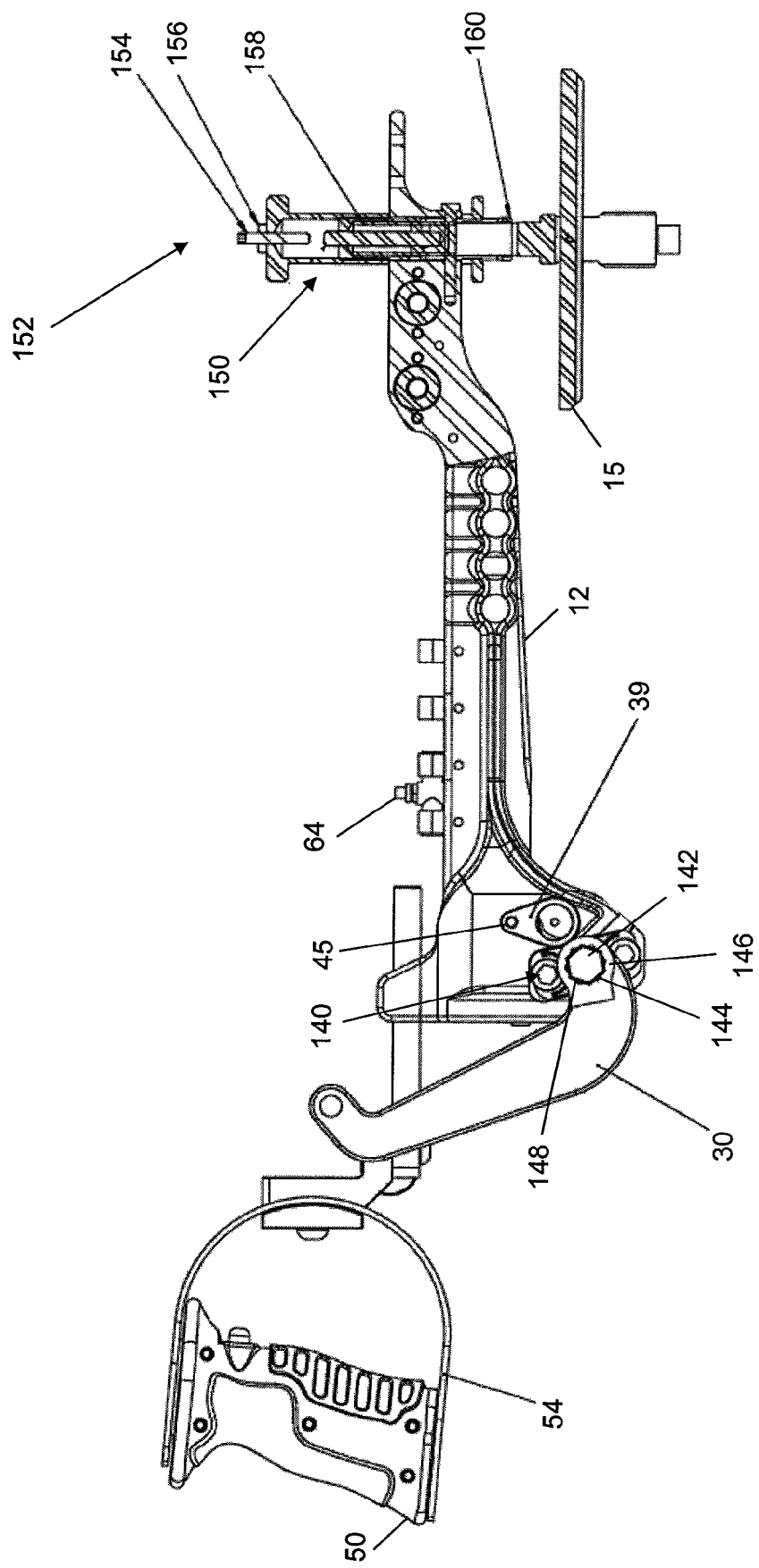
FIG. 5 illustrates a second side view of the frame of the swage device of FIG. 4, the second side view opposing the first side view.

In one arrangement, the swage device 10 also allows for fine adjustment of the position of the clamp member 24 relative to the saw blade 13. For example, with particular reference to FIG. 5, the clamp member 24 is configured as a clamp screw 140 having a screw head 142 defining a plurality of screw head contact surfaces 144. For example, in one arrangement, the clamp screw is an 8-pitch ACME screw having six screw head contact surfaces. In order to provide for fine adjustment of the clamp screw 140, the drive arm 30 includes a clamp screw interface 146 defining a plurality of screw head contact points 148 where the number of screw head contact points 148 is greater than the number of the screw head contact surfaces 144. For example, as indicated in FIG. 5, the clamp screw interface 146 includes a total of twelve screw head contact points 148, two contact points per clamp screw interface. In this arrangement, relatively large number of contact points 148 allows the operator to make minor adjustments to the position of the clamp screw 140 within the swage head 22 (e.g., either positioning the clamp screw 140 closer to or further away from the saw blade 13) regardless of the position of the drive arm 30 relative to the cylindrical housing 96. For example, after performing a coarse adjustment of the clamp screw 140 by positioning the cylindrical housing 96 on the frame 12, the operator then decouples the drive arm 30 from the clamp member 24 and manually adjusts the position of the clamp screw 140 within the swage head 22. Once the clamp screw 140 is in the desired position, the operator couples the drive arm 30 to the clamp screw 140. The relatively large number of contact points 148 relative to the number of the screw head contact surfaces 144 provides that, as the user recouples the drive arm 30 to the clamp screw 140, minimal change in the positioning of the drive arm 30 and the clamp screw 140 will take place. As such, the clamp screw 140 provides maximum clamping force on the saw blade 13 at the maximum retracted stroke position of the shaft 94 of the first pneumatic device 66.

While various embodiments of the invention have been particularly shown and described, it will be understood by those skilled in the art that various changes in form and details may be made therein without departing from the spirit and scope of the invention as defined by the appended claims.

For example, as indicated above and with reference to FIG. 1, the first and second actuator valves 41, 43 are configured to receive pressurized air from the manifold 62 and transmit the air to the timing valve 64 for further distribution to the a first and second pneumatic devices 66, 68. In one arrangement, the swage device 10 includes an actuator valve safety lock mechanism 145 that limits or prevents full engagement of the first actuator valve 41 without engagement of the second actuator valve 43. For example, in use, an operator depresses an actuation controller or button 51, associated with the first actuator valve 41, with one hand. The actuator valve safety lock mechanism 145 allows only partial actuation of the first actuator valve 41 (e.g., depression of the button 51 does not fully engage the first actuator valve 41. Next, in order to disengage the actuator valve safety lock mechanism 145, the operator depresses an actuation controller or button 53 with a second hand, Engagement of the button 53 trips the actuator valve safety lock mechanism and allows the operator to actuate both the first and second actuator valves 41, 43 to operate the swage device 10. The actuator valve safety lock mechanism 145 limits one-handed activation of the clamping and swaging mechanisms 14, 16. Additionally, the actuator valve safety lock mechanism 145 provides a level of safety to the operator of the swage device 10 by requiring that both the first and second actuator valves 41, 43 be actuated using two hands, prior to activation of the swaging and clamping mechanisms 14, 16.

As indicated above, lateral translation of swage anvil 40 within the swage head 22 causes the anvil 40 to contact a saw blade tooth 11 and provide support to the back portion of the saw blade tooth 11 during the swaging procedure. In certain cases, the angle 206 of the swage anvil 40 does not match an angle of the tooth 11. In one arrangement, in order to adjust the angular position of the swage anvil 40 relative to the tooth 11, the swage device 10 includes an angle adjustment mechanism 150 operable to raise or lower a distal portion 152 of the swage device 10. For example, as shown in FIG. 5, the angle adjustment mechanism 150 includes an adjusting screw 154, a lock nut 156, and a return spring 158 disposed within a housing 160. In use, actuation of the adjusting screw 154 compresses or expands the return spring 158 which, in turn, raises or lowers the distal portion 152 of the swage device 10 relative to the guide shoe 15. Such positioning adjusts the orientation of the swage anvil 40 relative to a back portion of a saw blade tooth 11. While the angle adjustment mechanism 150 can adjust the angle of the swage device 10 within any range, in one arrangement, the angle adjustment mechanism 150 provides a +/−1° change in the angle of inclination of the swage device 10. In one arrangement, the return spring 158 also causes the distal portion 152 of the swage device 10 to generate a downwardly acting force on the saw blade 13 during a swaging procedure. Such a downwardly acting force causes the swage anvil 40 to push the tip of a saw blade tooth 11 toward the saw blade 13 during the swaging procedure. As a result, the eccentric die 42 can swage the tooth 11 from the tooth tip to the tooth base where the tooth 11 meets the saw blade body.

As indicated above, to provide a coarse adjustment of the position of the clamp member 24 relative to the saw blade 13, the first pneumatic device 66 is selectively coupled to the frame 12 of the swage device 10. In one arrangement, the second pneumatic device 68 is also selectively coupled to the frame 12 of the swage device 10 to allow adjustment of the position of the eccentric die 42 of the swaging mechanism 16 relative to a saw blade tooth 11. For example, with reference to FIG. 2, the frame 12 includes a first pneumatic device clamp having a holder 160 and a lever 162 operable to release the second pneumatic device 68 from the holder 160 or to secure the second pneumatic device 68 to the holder 160. In use, to adjust the position of the eccentric die 42 within the swage head 22, the operator actuates the lever 162 to release the cylindrical housing 98 from the holder 160. The operator then positions the cylindrical housing 98 laterally relative to the saw blade 13 along either direction 120 or direction 121 to adjust the position of the drive arm 33 (e.g., as illustrated in FIG. 4) and, in turn, the rotational orientation of the eccentric die 42 within the swage head 22. Once in a desired position, the operator secures the cylindrical housing 98 to the frame 12 by tightening the holder 160 via the lever 162.

What is claimed is:

1. A swage device, comprising:
a frame;
a swaging mechanism coupled to the frame and being operable to swage a tooth of a saw blade;
a clamping mechanism coupled to the frame and being operable to secure the saw blade to the swage device, the clamping mechanism comprising a clamp screw having a screw head defining a plurality of screw head contact surfaces;
a first actuator coupled to the frame, the first actuator being actuatable by a first hand of an operator;
a second actuator coupled to the frame, the second actuator being actuatable by a second hand of the operator, the first actuator and the second actuator configured to control sequential operation of the clamping mechanism and the swaging mechanism after actuation of both the first actuator and the second actuator; and
a first pneumatic device coupled to the clamping mechanism and a second pneumatic device coupled to the swaging mechanism, actuation of both the first actuator and the second actuator operable to provide air to the first pneumatic device and the second pneumatic device to cause sequential operation of the clamping mechanism and the swaging mechanism;
the first pneumatic device comprising a drive arm having a first end coupled to the first pneumatic device and a second end coupled to the clamping mechanism, the second end of the drive arm defining a clamp screw interface defining a plurality of screw head contact points, the number of the plurality of screw head contact points being greater than the number of the plurality of screw head contact surfaces.

2. The swage device of claim 1, wherein:
the frame comprises a manifold having a manifold inlet configured to couple to a pressurized air source, a first manifold outlet, and a second manifold outlet;
the first actuator comprises a first actuator valve in fluid communication with the first manifold outlet and in fluid communication with the first pneumatic device;
the second actuator comprises a second actuator valve in fluid communication with the second manifold outlet and in fluid communication with the second pneumatic device.

3. The swage device of claim 2, further comprising a timing valve in fluid communication with the first actuator valve, the second actuator valve, the first pneumatic device and the second pneumatic device, the timing valve configure to (i) receive pressurized air from the first actuator valve and the second actuator valve, (ii) provide a first amount of pressurized air to the first pneumatic device to cause operation of the clamping mechanism, and (iii) provide a second amount of pressurized air to the second pneumatic device to cause operation of the swaging mechanism after operation of the clamping mechanism.

4. The swage device of claim 2, wherein the first actuator valve comprises an actuator valve safety lock mechanism.

5. The swage device of claim 1, wherein the frame comprises a first pneumatic device clamp configured to selectively couple the first pneumatic device to the frame.

6. The swage device of claim 2, wherein the frame comprises a second pneumatic device clamp configured to selectively couple the second pneumatic device to the frame.

7. The swage device of claim 1, wherein the swaging mechanism comprises a swage anvil coupled to the frame, the swage anvil having an elongate body having a first end, a second end, and a coupling portion disposed between the first end and the second end, the coupling portion being configured to couple to the swage device to allow lateral movement of the swage anvil relative to a long axis of the saw blade carried by the swage device, the elongate body and the coupling portion defining a tooth contact face extending between the first end and the second end, the tooth contact face defining an angle relative to a long axis of the elongate body, the angle of the contact face corresponding to an angle defined by a back portion of the tooth of the saw blade and relative to the long axis of the saw blade such that the tooth contact face abuts the back portion of the tooth.

8. The swage device of claim 7, comprising an angle adjustment mechanism configured to adjust an angular position of the frame of the swage device relative to the long axis of the saw blade in order to adjust the angular position of the swage anvil of the swaging mechanism relative to the saw blade tooth.

9. The swage device of claim 1, wherein:
the swage device comprise a swage head configured to receive a portion of the saw blade;
the swaging mechanism comprises a swage anvil coupled to the swage head and an eccentric die coupled to the swage head, the swaging mechanism being operable to swage the tooth of the saw blade; and the clamping mechanism comprises a clamp member rotatably coupled to the swage head and a stationary member coupled to the swage head, the clamping mechanism being operable to secure the saw blade to the swage device.

10. The swage device of claim 1, wherein the clamp screw interface of the second end of the drive arm defines a socket configured to receive and secure to the screw head.

11. The swage device of claim 1, wherein the drive arm, by a single drive arm stroke is configured to rotate the clamp screw and cause the clamp screw to travel along a distance to one of secure the saw blade to the swage device prior to a tooth swaging procedure and release the saw blade from the swage device at the conclusion of a tooth swaging procedure.

12. The swage device of claim 1, wherein actuation of both the first actuator and the second actuator is configured to provide air sequentially to the first pneumatic device and the second pneumatic device to cause sequential operation of the clamping mechanism and the swaging mechanism.

13. A swage system, comprising:
a frame;
a swaging mechanism coupled to the frame and being operable to swage a tooth of a saw blade;
a clamping mechanism coupled to the frame and being operable to secure the saw blade to the swage system, the clamping mechanism comprising a clamp screw having a screw head defining a plurality of screw head contact surfaces;
a first pneumatic device coupled to the clamping mechanism and a second pneumatic device coupled to the swaging mechanism;
a pressurized air source in fluid communication with the first pneumatic device and the second pneumatic device;
a first actuator coupled to the frame and in fluid communication with the first pneumatic device and the second pneumatic device, the first actuator being actuatable by a first hand of an operator;
a second actuator coupled to the frame, and in fluid communication with the first pneumatic device and the second pneumatic device, the second actuator being actuatable by a second hand of the operator, actuation of both the first actuator and the second actuator operable to provide air to the first pneumatic device and the second pneumatic device to cause sequential operation of the clamping mechanism and the swaging mechanism;
the first pneumatic device comprising a drive arm having a first end coupled to the first pneumatic device and a second end coupled to the clamping mechanism, the second end of the drive arm defining a clamp screw interface defining a plurality of screw head contact points, the number of the plurality of screw head contact points being greater than the number of the plurality of screw head contact surfaces.

14. The swage system of claim 13, wherein:
the frame comprises an air distribution manifold having a manifold inlet configured to couple to the pressurized air source, a first manifold outlet, and a second manifold outlet;

the first actuator comprises a first actuator valve in fluid communication with the first manifold outlet and in fluid communication with the first pneumatic device;
the second actuator comprises a second actuator valve in fluid communication with the second manifold outlet and in fluid communication with the second pneumatic device.

15. The swage system of claim 14, further comprising a timing valve in fluid communication with the first actuator valve, the second actuator valve, the first pneumatic device and the second pneumatic device, the timing valve configure to (i) receive pressurized air from the first actuator valve and the second actuator valve, (ii) provide a first amount of pressurized air to the first pneumatic device to cause operation of the clamping mechanism, and (iii) provide a second amount of pressurized air to the second pneumatic device to cause operation of the swaging mechanism after operation of the clamping mechanism.

16. The swage system of claim 14, wherein the first actuator valve comprises an actuator valve safety lock mechanism.

17. The swage system of claim 13, wherein the frame comprises a first pneumatic device clamp configured to selectively couple the first pneumatic device to the frame.

18. The swage system of claim 13, wherein the frame comprises a second pneumatic device clamp configured to selectively couple the second pneumatic device to the frame.

19. The swage system of claim 13, wherein the swaging mechanism comprises a swage anvil coupled to the frame, the swage anvil having an elongate body having a first end, a second end, and a coupling portion disposed between the first end and the second end, the coupling portion being configured to couple to the swage system to allow lateral movement of the swage anvil relative to a long axis of the saw blade carried by the swage system, the elongate body and the coupling portion defining a tooth contact face extending between the first end and the second end, the tooth contact face defining an angle relative to a long axis of the elongate body, the angle of the contact face corresponding to an angle defined by a back portion of a tooth of the saw blade and relative to the long axis of the saw blade such that the tooth contact face abuts the back portion of the tooth.

20. The swage system of claim 19, comprising an angle adjustment mechanism configured to adjust an angular position of the frame of the swage system relative to a long axis of the saw blade in order to adjust the angular position of the swage anvil of the swaging mechanism relative to the saw blade tooth.

21. The swage system of claim 13, wherein:
the swage system comprise a swage head configured to receive a portion of the saw blade;
the swaging mechanism comprises a swage anvil coupled to the swage head and an eccentric die coupled to the swage head, the swaging mechanism being operable to swage the tooth of the saw blade; and
the clamping mechanism comprises a clamp member rotatably coupled to the swage head and a stationary member coupled to the swage head, the clamping mechanism being operable to secure the saw blade to the swage system.

* * * * *

UNITED STATES PATENT AND TRADEMARK OFFICE
CERTIFICATE OF CORRECTION

PATENT NO. : 7,861,617 B2
APPLICATION NO. : 11/731621
DATED : January 4, 2011
INVENTOR(S) : James S. Weatherly, Sr. et al.

Page 1 of 1

It is certified that error appears in the above-identified patent and that said Letters Patent is hereby corrected as shown below:

Claim 5, Column 10, Lines 35-37, The swage device of claim 1, wherein the frame comprises a first pneumatic device clamp configured to selectively couple the first pneumatic device to the frame should read -- The swage device of claim 1, wherein the frame comprises a pneumatic device clamp configured to selectively couple the first pneumatic device to the frame --.

Claim 6, Column 10, Lines 38-40, The swage device of claim 2, wherein the frame comprises a second pneumatic device clamp configured to selectively couple the second pneumatic device to the frame should read -- The swage device of claim 2, wherein the frame comprises a pneumatic device clamp configured to selectively couple the second pneumatic device to the frame --.

Claim 17, Column 12, Lines 21-23, The swage system of claim 13, wherein the frame comprises a first pneumatic device clamp configured to selectively couple the first pneumatic device to the frame should read -- The swage system of claim 13, wherein the frame comprises a pneumatic device clamp configured to selectively couple the first pneumatic device to the frame --.

Claim 18, Column 12, Lines 24-26, The swage system of claim 13, wherein the frame comprises a second pneumatic device clamp configured to selectively couple the second pneumatic device to the frame should read -- The swage system of claim 13, wherein the frame comprises a pneumatic device clamp configured to selectively couple the second pneumatic device to the frame --.

Signed and Sealed this
Twenty-second Day of February, 2011

David J. Kappos
*Director of the United States Patent and Trademark Office*